United States Patent
Khalatian

(10) Patent No.: US 10,038,788 B1
(45) Date of Patent: Jul. 31, 2018

(54) SELF-LEARNING ADAPTIVE ROUTING SYSTEM

(71) Applicant: Oracle International Corporation, Redwood Shores, CA (US)

(72) Inventor: Igor Khalatian, Morganville, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/590,543

(22) Filed: May 9, 2017

(51) Int. Cl.
*H04M 3/00* (2006.01)
*H04M 5/00* (2006.01)
*H04M 3/51* (2006.01)
*H04L 29/06* (2006.01)
*H04L 12/24* (2006.01)
*H04M 7/00* (2006.01)
*H04M 3/523* (2006.01)

(52) U.S. Cl.
CPC ...... *H04M 3/5191* (2013.01); *H04L 41/5064* (2013.01); *H04L 65/1069* (2013.01); *H04L 65/60* (2013.01); *H04M 3/5233* (2013.01); *H04M 7/0042* (2013.01)

(58) Field of Classification Search
CPC . H04L 41/5064; H04L 65/1069; H04L 65/60; H04M 3/5191; H04M 3/5233; H04M 7/0042
USPC ...................................... 379/265.09
See application file for complete search history.

(56) References Cited

U.S. PATENT DOCUMENTS

| | | | |
|---|---|---|---|
| 5,107,443 A | 4/1992 | Smith et al. | |
| 5,515,491 A | 5/1996 | Bates et al. | |
| 5,838,906 A | 11/1998 | Doyle et al. | |
| 5,872,923 A | 2/1999 | Schwartz et al. | |
| 5,884,014 A | 3/1999 | Huttenlocher et al. | |
| 5,960,411 A | 9/1999 | Hartman et al. | |
| 6,308,199 B1 | 10/2001 | Katsurabayashi | |

(Continued)

FOREIGN PATENT DOCUMENTS

| WO | 2007073209 | | 6/2007 |
|---|---|---|---|
| WO | 2008008806 | A2 | 1/2008 |
| WO | 2008008806 | A3 | 10/2008 |

OTHER PUBLICATIONS

Andersen, GUI Review: Gmail® by Google©, Nov. 5, 2011, pp. 1-26.

(Continued)

*Primary Examiner* — Khai N Nguyen
(74) *Attorney, Agent, or Firm* — Kilpatrick Townsend & Stockton LLP

(57) ABSTRACT

A method for self-learning adaptive routing can include receiving a contact along with a sequence of events from a customer via a graphical user interface on a web page within a browser window. A universal resource locator ("URL") of the web page can be captured and mapped with the sequence of events to the contact. A matching routing rule can be used to route the contact to an appropriate customer service queue. An agent associated with the customer service queue can view a co-browsing preview of the customer's desktop, which the agent can use to transfer the contact to a different customer service queue. A machine learning algorithm can create a new routing rule based on the URL of the web page, the sequence of events, the co-browsing preview, the second routing, and the determination that the second agent associated with the second customer service queue resolved the contact.

20 Claims, 7 Drawing Sheets

(56) References Cited

U.S. PATENT DOCUMENTS

| | | |
|---|---|---|
| 6,331,855 B1 | 12/2001 | Schauser |
| 6,396,520 B1 | 5/2002 | Ording |
| 6,442,590 B1 | 8/2002 | Inala et al. |
| 6,460,081 B1 | 10/2002 | Doherty et al. |
| 6,717,607 B1 | 4/2004 | Lauper et al. |
| 6,785,708 B1 | 8/2004 | Busey et al. |
| 7,149,776 B1 | 12/2006 | Roy et al. |
| 7,185,056 B2 | 2/2007 | Fujisawa et al. |
| 7,263,526 B1 | 8/2007 | Busey et al. |
| 7,343,567 B2 | 3/2008 | Mann et al. |
| 7,933,955 B2 | 4/2011 | Khalatian |
| 8,046,259 B1 | 10/2011 | Siegel et al. |
| 8,117,560 B1 | 2/2012 | Lu et al. |
| 8,495,660 B1 | 7/2013 | Hernacki |
| 8,788,949 B2 | 7/2014 | Hunt et al. |
| 8,831,203 B2* | 9/2014 | Chang ............... H04M 3/5175 379/201.01 |
| 8,842,156 B1 | 9/2014 | Alekhin |
| 9,313,332 B1 | 4/2016 | Kumar et al. |
| 9,535,651 B2 | 1/2017 | Khalatian |
| 9,874,990 B2 | 1/2018 | Khalatian |
| 2002/0038346 A1 | 3/2002 | Morrison et al. |
| 2002/0101445 A1 | 8/2002 | Berque |
| 2002/0138624 A1 | 9/2002 | Esenther |
| 2002/0191028 A1 | 12/2002 | Senechalle et al. |
| 2003/0085923 A1 | 5/2003 | Chen et al. |
| 2003/0088623 A1 | 5/2003 | Kusuda |
| 2003/0093464 A1 | 5/2003 | Clough et al. |
| 2004/0075619 A1 | 4/2004 | Hansen |
| 2004/0078441 A1 | 4/2004 | Malik et al. |
| 2004/0080504 A1 | 4/2004 | Salesky et al. |
| 2004/0210658 A1 | 10/2004 | Guillermo et al. |
| 2004/0240642 A1* | 12/2004 | Crandell ............. H04L 51/12 379/88.22 |
| 2004/0252185 A1 | 12/2004 | Vernon et al. |
| 2004/0253991 A1 | 12/2004 | Azuma |
| 2004/0268263 A1 | 12/2004 | Van Dok et al. |
| 2005/0129275 A1 | 6/2005 | Porter et al. |
| 2005/0129277 A1 | 6/2005 | Porter et al. |
| 2005/0141694 A1 | 6/2005 | Wengrovitz |
| 2005/0223343 A1 | 10/2005 | Travis et al. |
| 2005/0235014 A1 | 10/2005 | Schauser et al. |
| 2005/0246634 A1 | 11/2005 | Ortwein et al. |
| 2005/0268237 A1 | 12/2005 | Crane et al. |
| 2006/0031779 A1 | 2/2006 | Theurer et al. |
| 2006/0130109 A1 | 6/2006 | Zenith |
| 2007/0038956 A1 | 2/2007 | Morris |
| 2007/0245249 A1 | 10/2007 | Weisberg |
| 2008/0016155 A1 | 1/2008 | Khalatian |
| 2008/0052377 A1 | 2/2008 | Light |
| 2008/0167124 A1 | 7/2008 | Korchemniy et al. |
| 2008/0209387 A1 | 8/2008 | Biehl et al. |
| 2008/0276183 A1 | 11/2008 | Siegrist et al. |
| 2008/0276184 A1 | 11/2008 | Buffet et al. |
| 2009/0024952 A1 | 1/2009 | Brush et al. |
| 2009/0055500 A1 | 2/2009 | Haynes et al. |
| 2009/0100328 A1 | 4/2009 | Asakawa et al. |
| 2009/0158163 A1 | 6/2009 | Stephens et al. |
| 2009/0164581 A1 | 6/2009 | Bove et al. |
| 2009/0219379 A1 | 9/2009 | Rossato et al. |
| 2009/0247136 A1 | 10/2009 | Srinivasan et al. |
| 2009/0254840 A1 | 10/2009 | Churchill et al. |
| 2009/0271713 A1 | 10/2009 | Stull et al. |
| 2009/0327441 A1 | 12/2009 | Lee et al. |
| 2010/0017412 A1 | 1/2010 | Horowitz et al. |
| 2010/0036670 A1 | 2/2010 | Hill et al. |
| 2010/0037153 A1 | 2/2010 | Rogers |
| 2010/0111406 A1 | 5/2010 | Hertzfeld et al. |
| 2010/0115042 A1 | 5/2010 | Turner |
| 2010/0131868 A1 | 5/2010 | Chawla et al. |
| 2010/0158236 A1* | 6/2010 | Chang ............... H04M 3/5175 379/265.03 |
| 2010/0199187 A1 | 8/2010 | Lin et al. |
| 2010/0257457 A1 | 10/2010 | De Goes |
| 2010/0296646 A1 | 11/2010 | Hemm et al. |
| 2010/0306642 A1 | 12/2010 | Lowet et al. |
| 2011/0087984 A1 | 4/2011 | Jitkoff et al. |
| 2011/0154219 A1 | 6/2011 | Khalatian |
| 2011/0173256 A1 | 7/2011 | Khalatian |
| 2011/0182283 A1* | 7/2011 | Van Buren .......... H04M 3/4936 370/352 |
| 2011/0276900 A1 | 11/2011 | Khan et al. |
| 2011/0307402 A1 | 12/2011 | Krishnakumar et al. |
| 2012/0030616 A1 | 2/2012 | Howes et al. |
| 2012/0069045 A1 | 3/2012 | Hashimoto et al. |
| 2012/0185784 A1 | 7/2012 | Katz |
| 2012/0189272 A1 | 7/2012 | Kunigita et al. |
| 2012/0254770 A1 | 10/2012 | Ophir |
| 2013/0055113 A1 | 2/2013 | Chazin et al. |
| 2013/0080928 A1 | 3/2013 | Zhuang et al. |
| 2013/0212466 A1 | 8/2013 | Khalatian |
| 2014/0119531 A1 | 5/2014 | Tuchman et al. |
| 2014/0129622 A1 | 5/2014 | Michaeli et al. |
| 2014/0161241 A1 | 6/2014 | Baranovsky et al. |
| 2014/0164934 A1 | 6/2014 | Yang |
| 2014/0173078 A1 | 6/2014 | McCord et al. |
| 2014/0219438 A1* | 8/2014 | Brown ............... H04M 3/5191 379/265.09 |
| 2014/0258501 A1 | 9/2014 | D'Arcy et al. |
| 2014/0278534 A1 | 9/2014 | Romeo |
| 2014/0341369 A1* | 11/2014 | Chang ............... H04M 3/5175 379/265.09 |
| 2015/0052067 A1 | 2/2015 | Thiyagarajan et al. |
| 2015/0055772 A1 | 2/2015 | Klemm et al. |
| 2015/0149916 A1 | 5/2015 | Mendez et al. |
| 2015/0244814 A1 | 8/2015 | Khalatian et al. |
| 2015/0278534 A1 | 10/2015 | Thiyagarajan et al. |
| 2015/0310446 A1 | 10/2015 | Tuchman et al. |
| 2015/0324772 A1 | 11/2015 | Sarris |
| 2016/0182721 A1 | 6/2016 | Khalatian et al. |
| 2017/0070526 A1* | 3/2017 | Bailey ............... H04L 63/1416 |
| 2017/0090853 A1 | 3/2017 | Khalatian et al. |

OTHER PUBLICATIONS

Antoine et al., Java applet screenshot, USENET thread, <http://www.velocityreviews.com/forums/t136047-java-appletscreenshot.html, Aug. 12, 2004, 6 pages.

Hoyos, How to Use Facebook Chat Options, about.com, http://im.about.com/od/facebookcha1/ss/facebook-chat-options.htm#showall, 5 pages.

Ohren, Facebook Updates Chat UI—It's Faster & More Stable, Oct. 6, 2010, pp. 1-5.

International Application No. PCT/US2007/073209, International Preliminary Report on Patentability dated Jan. 13, 2009, 8 pages.

International Application No. PCT/US2007/073209, International Search Report and Written Opinion dated Aug. 13, 2008, 8 pages.

Siden, Signed Applet Tutorial, <http://web.archive.org/web/20060513070748/http:1/www-personal.umich.edu/-Isiden/tutorials/signed-appletIsignedapplet.html>, Internet Archive on May 13, 2006, pp. 1-5.

Udell, Simple, single-purpose screen sharing, www.infoworld.com/prinU25674; published on InfoWorld, date web page visited: Jan. 3, 2010, 2 pages.

dictionary.com, https://web.archive.org/web/20110727234611/http://dictionary.reference.com/browse/Expand, Jul. 27, 2011, 2 pages.

SocialTimes, Facebook Chat Launches—Tour & First Impressions, Apr. 6, 2008, pp. 1-5.

Bold Software Partners with LiveLOOK to Enhance BoldCCM Product Suites, www.prweb.com/releases/BoldSoftware/LiveLOOK/prweb2536784.htm, date web page visited: Nov. 17, 2009, 2 pages.

Bosco's Screen Share: Web Screen Sharing, Hutchings Software, <http://web.archive.org/web/20050305232959/www.componentx.com/ScreenShare/web.php>, Mar. 5, 2005, 7 pages.

Free Web Conferencing and Always-On Collaboration, www.vyew.com, Jul. 25. 2006, 20 pages.

Instant Screen Sharing with no download . . . , web page; showscreen.com/screen_sharing_partners, date web page visited: Jan. 3, 2010, 3 pages.

(56) References Cited

OTHER PUBLICATIONS

Instant Service Adds LiveLOOK's CoBrowsing Capabilities to Chat Solution, www.instantservice.com/news/20071106.html, date web page visited: Nov. 17, 2009, 2 pages.
LiveLOOK is a leading provider of real-time . . . , www.livelook.com/about_us.asp, date web page visited: Jan. 7, 2010, 2 pages.
News Release, New Jersey Economic Development Authority, Nov. 2008, 2 pages.
nGenera CIP Partners with LiveLOOK, Enhances Its Multi-Channel Solution by Boosting the Power of NGen CoBrowse, web page; www.reuters.com/article/pressRelease/idUS120651+14-Apr-2009+BW20090414, date web page visited: Nov. 17, 2009, 3 pages.
PictureTalk FAQs, Pixion, Inc., <http://web.archive.org/web/20050305010259/www.pixion.com/supportFaq.html>, Mar. 5, 2005, 7 pages.
Press Release, LiveLOOK wins Best Technology at Web 2.0 Summit, Jun. 21, 2007, 1 page.
Screen-Sharing: One-Click Solution Lets Anyone Screen-Share Instantly From Any OS-LiveLOOK, web page: www.masternewmedia.org, date web page visited: Jan. 6, 2010, 14 pages.
TightVNC Java Viewer version 1.2.9, TightVNC project, <http://lweb.archive.org/web/20030810163821/tightvnc.com/doc/java/READM E. txt>, Aug. 10, 2003, 8 pages.
WebsiteAiive Chooses Live look to Offer Instant Sceen Sharing, websitealive.com/articles-press/websitealive-chooses-livelook, date web page visited: Jan. 3, 2010, 2 pages.
U.S. Appl. No. 11/456,613, Final Office Action dated Jul. 13, 2009, 18 pages.
U.S. Appl. No. 11/456,613, Non-Final Office Action dated Aug. 8, 2008, 16 pages.
U.S. Appl. No. 11/456,613, Non-Final Office Action dated May 6, 2010, 22 pages.
U.S. Appl. No. 11/456,613, Notice of Allowance dated Jan. 12, 2011, 7 pages.
U.S. Appl. No. 12/970,501, Advisory Action dated Jul. 22, 2013, 3 pages.
U.S. Appl. No. 12/970,501, Advisory Action dated Oct. 15, 2015, 3 pages.
U.S. Appl. No. 12/970,501, Final Office Action dated May 15, 2013, 11 pages.
U.S. Appl. No. 12/970,501, Final Office Action dated Jul. 31, 2015, 12 pages.
U.S. Appl. No. 12/970,501, Non-Final Office Action dated Feb. 5, 2013, 11 pages.
U.S. Appl. No. 12/970,501, Non-Final Office Action dated Feb. 12, 2015, 12 pages.
U.S. Appl. No. 12/970,501, Non-Final Office Action dated Apr. 26, 2016, 14 pages.
U.S. Appl. No. 12/970,501, Notice of Allowance dated Sep. 1, 2016, 7 pages.
U.S. Appl. No. 13/071,607, Non-Final Office Action dated Aug. 5, 2011, 22 pages.
U.S. Appl. No. 13/762,725, Advisory Action dated Feb. 3, 2016, 5 pages.
U.S. Appl. No. 13/762,725, Final Office Action dated Nov. 12, 2015, 21 pages.
U.S. Appl. No. 13/762,725, Final Office Action dated Sep. 27, 2016, 32 pages.
U.S. Appl. No. 13/762,725, Non-Final Office Action dated May 5, 2016, 17 pages.
U.S. Appl. No. 13/762,725, Non-Final Office Action dated Apr. 9, 2015, 19 pages.
U.S. Appl. No. 14/628,640, Non-Final Office Action dated Feb. 24, 2017, 13 pages.
U.S. Appl. No. 14/851,268, Final Office Action dated Dec. 12, 2016, 17 pages.
U.S. Appl. No. 14/851,268, Non-Final Office Action dated May 9, 2016, 15 pages.
U.S. Appl. No. 12/970,501, Corrected Notice of Allowability dated Nov. 22, 2016, 2 pages.
U.S. Appl. No. 13/762,725, Notice of Allowance dated Oct. 3, 2017, 13 pages.
U.S. Appl. No. 14/628,640, Advisory Action dated Sep. 15, 2017, 3 pages.
U.S. Appl. No. 14/628,640, Final Office Action dated Jun. 22, 2017, 17 pages.
U.S. Appl. No. 14/851,268, Non-Final Office Action dated Jun. 20, 2017, 17 pages.
U.S. Appl. No. 14/851,268, Notice of Allowance dated Jan. 4, 2018, 5 pages.
U.S. Appl. No. 14/865,711, Non-Final Office Action dated Jan. 19, 2018, 12 pages.

* cited by examiner

SELF-LEARNING ADAPTIVE ROUTING SYSTEM

CROSS-REFERENCES TO RELATED APPLICATIONS

This application is related to U.S. patent application Ser. No. 14/851,268 entitled CO-BROWSING PREVIEW OF QUEUED CUSTOMER CONTACTS, filed Sep. 11, 2015, which is incorporated by reference herein for all purposes.

BACKGROUND

Call centers receiving calls for support may have an automated system that can route the calls to an appropriate agent. However, the development and maintenance of the routing rules for such systems is expensive and time consuming. In many systems, to keep the cost down, the routing rules are very general. The result is that the customer is often routed to an agent that is unable to help the customer and has to transfer the customer to the correct agent, which costs time and money for the company and can leave the company with an angry customer. For example, a customer routed to an incorrect agent may be connected with the agent, spend 30 seconds explaining the issue to the agent, be told that the agent needs to transfer the customer, wait for an appropriate agent to help the customer, and spend another 30 seconds explaining the issue again. Even the 30 seconds spent by the agent listening to the customer just to decide he or she cannot help the customer, when multiplied by thousands of calls each day, turns into millions of lost dollars for the company. In addition, the customer is angry or annoyed that he had to repeat the issue to more than one agent to get a resolution. In other cases, the routing rules are more sophisticated and tailored to the company, but they are expensive to develop and maintain. Implementation of tailored systems can cost a company hundreds of thousands of dollars to set up and thousands of dollars monthly to maintain. And if the maintenance is not handled, the customers may be incorrectly routed, which results in the same issues discussed above. Accordingly, an improved system is needed for routing customers to agents in call centers.

BRIEF SUMMARY

Methods and systems for improving a customer relationship management ("CRM") system are described herein. The method can include receiving a contact from a customer, the contact being initiated through a graphical user interface on a web page within a browser window. The method can further include receiving a sequence of events captured from an interaction of the customer with the web page within the browser window. The method can further include capturing a universal resource locator ("URL") of the web page and mapping the URL of the web page and the sequence of events to the contact. The method can further include searching a database of routing rules and matching a routing rule from the database to the contact. Based on the matching rule, the customer can be routed to an appropriate customer service queue. The method can include providing a co-browsing preview of the customer's browser window to an agent associated with the customer service queue. After the preview, a second routing of the contact from the customer service queue to a second customer service queue can be detected. The method can further include determining that a second agent associated with the second customer service queue resolved the contact. The method can also include creating a second routing rule using a machine learning algorithm based on the URL of the web page, the sequence of events, the co-browsing preview, the second routing, and the determination that the second agent associated with the second customer service queue resolved the contact.

The method can optionally include receiving a second contact from a second customer, the second contact being initiated through the graphical user interface on the web page within a second browser window. The method can optionally include receiving a second sequence of events captured from an interaction of the second customer with the web page within the second browser window, wherein the second sequence of events is equivalent to the first sequence of events. The method can optionally include mapping the URL of the web page and the second sequence of events with the second contact. The method can optionally include routing the second contact to the second customer service queue using the second routing rule.

The machine learning algorithm can optionally include detecting contacts that have been initiated through the graphical user interface on the web page and have been routed from the first customer service queue to the second customer service queue. The machine learning algorithm can optionally include determining that a sufficient number of the contacts were resolved by agents associated with the second customer service queue to warrant enabling the second routing rule to route contacts initiated through the graphical user interface of the web page directly to the second customer service queue. The machine learning algorithm can even further include detecting a second set of contacts that have been initiated through the graphical user interface on the web page and have been routed from the second customer service queue to a third customer service queue. In response to determining that the sufficient number of contacts from the second set of contacts were resolved by agents associated with the third customer service queue, the machine learning algorithm can include creating and enabling a third routing rule to route contacts initiated through the graphical user interface of the web page to the third customer service queue. The machine learning algorithm can optionally include disabling the second routing rule.

The method can optionally include that at least one event of the sequence of events is an error code. The method can optionally include that the first event of the sequence of events is a login attempt, the second event is an error code corresponding to a failed login attempt, and the second customer service queue is a security team queue.

Described herein is also an improved CRM system. The system can include a processor and a memory. The memory can have instructions stored within that can be executed by the processor. Executing the instructions can cause the system to receive a contact from a customer, the contact being initiated through a graphical user interface on a web page within a browser window. The system can also receive a sequence of events captured from an interaction of the customer with the web page within the browser window. The system can also capture a URL of the web page. The system can also map the URL of the web page and the sequence of events with the contact. The system can also query a rule store that stores routing rules. The system can also match a first routing rule to the contact. The system can also route the contact to a first customer service queue based on the first routing rule. The system can also provide a co-browsing preview of the browser window to a computer of a first agent associated with the first customer service queue. The system can also detect a second routing of the contact from the first customer service queue to a second customer service queue. The system can also determine that a second agent associated with the second customer service queue resolved the contact. The system can also create a second routing rule using a machine learning algorithm based on the URL of the web page, the sequence of events, the co-browsing preview, the second routing, and the determination that the second agent associated with the second customer service queue resolved the contact.

The memory can include further instructions that cause the processor to receive a second contact from a second customer, the second contact being initiated through the graphical user interface on the web page within a second browser window. The system can also receive a second sequence of events captured from a second interaction of the second customer with the web page within the second browser window, wherein the second sequence of events is equivalent to the first sequence of events. The system can also map the URL of the web page and the second sequence of events with the second contact. The system can also route the second contact to the second customer service queue using the second routing rule.

The machine learning algorithm can also detect contacts that have been initiated through the graphical user interface on the web page and have been routed from the first customer service queue to the second customer service queue. The machine learning algorithm can further determine that a threshold number of the contacts were resolved by agents associated with the second customer service queue. In response to determining that the threshold number of contacts were resolved by the agents associated with the second customer service queue, the machine learning algorithm can enable the second routing rule to route contacts initiated through the graphical user interface of the web page to the second customer service queue.

The machine learning algorithm can optionally detect different contacts that have been initiated through the graphical user interface on the web page and have been routed from the second customer service queue to a third customer service queue. In response to determining that the threshold number of contacts from the contacts were resolved by agents associated with the third customer service queue, the machine learning algorithm can create a third routing rule to route contacts initiated through the graphical user interface of the web page to the third customer service queue. The machine learning algorithm can further enable the third routing rule to route contacts initiated through the graphical user interface of the web page to the third customer service queue. The machine learning algorithm can optionally disable the second routing rule.

Optionally, the first agent can manually route the contact to the second customer service queue based on the preview co-browsing of the web page with the customer. Optionally, at least one event from the sequence of events is an error code. Optionally, the first event of the sequence of events is a login attempt, the second event of the sequence of events is an error code corresponding to a failed login attempt, and the second customer service queue is a security team queue.

Described herein is also a computer-readable memory device. The computer readable memory device can store instructions for execution by a processor. When executed by the processor, the instructions can cause the processor to receive a contact from a customer, the contact being initiated through a graphical user interface on a web page within a browser window. The processor can also receive a sequence of events captured from an interaction of the customer with the web page within the browser window. The processor can further capture a URL of the web page. The processor can also map the URL of the web page and the sequence of events with the contact. The processor can also query a rule store having a plurality of routing rules. The processor can also match a first routing rule of the plurality of routing rules to the contact. The processor can also route the contact to a first customer service queue based on the first routing rule. The processor can also provide a co-browsing preview of the browser window to a computer of a first agent associated with the first customer service queue. The processor can also detect a second routing of the contact from the first customer service queue to a second customer service queue. The processor can further determine that a second agent associated with the second customer service queue resolved the contact. The processor can also create a second routing rule using a machine learning algorithm based on the URL of the web page, the sequence of events, the co-browsing preview, the second routing, and the determination that the second agent associated with the second customer service queue resolved the contact.

Optionally, the processor can receive a second contact from a second customer, the second contact being initiated through the graphical user interface on the web page within a second browser window. The processor can also optionally receive a second sequence of events captured from a second interaction of the second customer with the web page within the second browser window, wherein the second sequence of events is equivalent to the first sequence of events. The processor can also optionally map the URL of the web page and the second sequence of events with the second contact. The processor can also optionally route the second contact to the second customer service queue using the second routing rule.

Optionally, the processor can detect a plurality of contacts that have been initiated through the graphical user interface on the web page and have been routed from the first customer service queue to the second customer service queue. The processor can also optionally determine that a threshold number of the plurality of contacts were resolved by one or more agents associated with the second customer service queue. In response to determining that the threshold number of contacts were resolved by the agents associated with the second customer service queue, the processor can further optionally enable the second routing rule to route contacts initiated through the graphical user interface of the web page to the second customer service queue.

Optionally, the machine learning algorithm can include detecting a second plurality of contacts that have been initiated through the graphical user interface on the web page and have been routed from the second customer service queue to a third customer service queue. In response to determining that the threshold number of contacts from the second plurality of contacts were resolved by one or more agents associated with the third customer service queue, the machine learning algorithm can further optionally include creating a third routing rule to route contacts initiated through the graphical user interface of the web page to the third customer service queue. The machine learning algorithm can further include enabling the third routing rule to route contacts initiated through the graphical user interface of the web page to the third customer service queue. The machine learning algorithm can further optionally include disabling the second routing rule.

Optionally, the first agent manually routes the contact to the second customer service queue based on the preview co-browsing of the web page with the customer. Optionally, at least one event is an error code.

DETAILED DESCRIPTION

Figure 1:
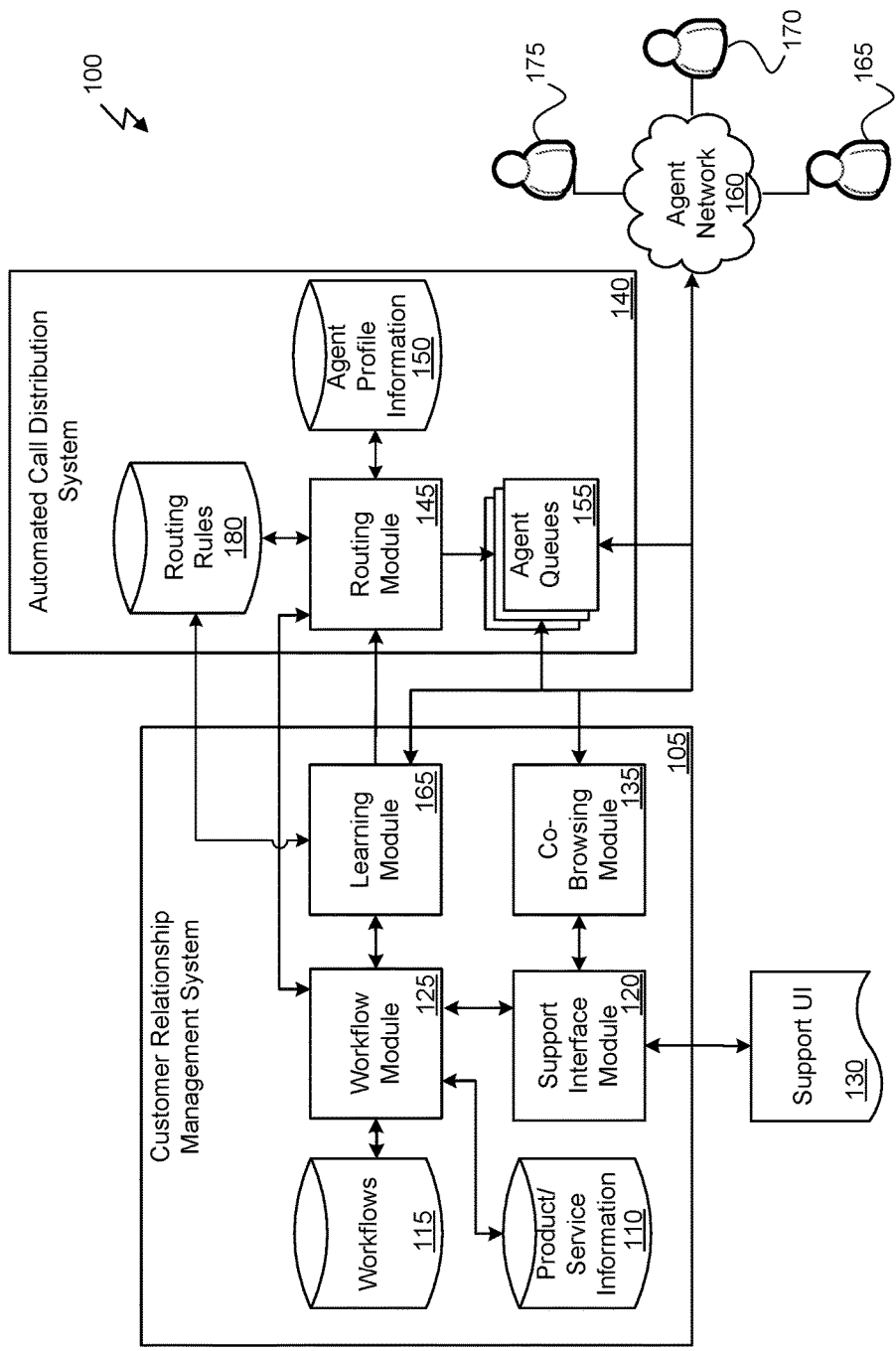
FIG. 1 is a block diagram illustrating, at a high-level, functional components of a system for providing a self-learning adaptive routing system according to one embodiment.

Customer support agents (also referred to herein as customer service agents, service agents, support agents, and agents) often find themselves in the position of, after discussing a problem with a customer for a few moments, determining that he or she cannot help the customer with their issue and, consequently, transferring the customer to a different agent or support queue (also referred to herein as customer service queue, customer support queue, agent queue, agent support queue, and queue). Particularly in a computer chat scenario, the agent can, in some cases, determine that the customer should be transferred before the customer even knows that he or she was not directed to the correct agent in the first place. Described herein are systems and methods for a self-learning adaptive routing system to route the customer to the correct agent without the customer knowing of incorrect transfers. Over time, the self-learning adaptive routing system can minimize incorrect transfers.

An enormous advantage of the self-learning adaptive routing system described herein over other systems is that the system utilizes machine learning to become a specialized system for the company that has installed and is utilizing the system. While all companies can begin with the same or similar original system, over time, rules will be automatically learned (i.e., created and enabled) that will allow the system to transform from a generic system to a very specialized system uniquely built for the company executing the system. While that type of specialized system has been expensive to develop and maintain in the past, the technology described herein provides a resolution that allows a more cost effective and accurate implementation using technologically advanced machine learning.

In the following description, for the purposes of explanation, numerous specific details are set forth in order to provide a thorough understanding of various embodiments. It will be apparent, however, to one skilled in the art that embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other non-transitory mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements and are stored on a machine-readable medium. A code segment may be coupled to another code segment or a hardware circuit during execution by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating, at a high-level, functional components of a system for providing a self-learning adaptive routing system. In this example, the system 100 includes a Customer Relationship Management ("CRM") system 105, a support user interface ("UP") 130, an Automated Call Distribution ("ACD") system 140, an agent network 160, and agents 165, 170, and 175.

Figure 7:
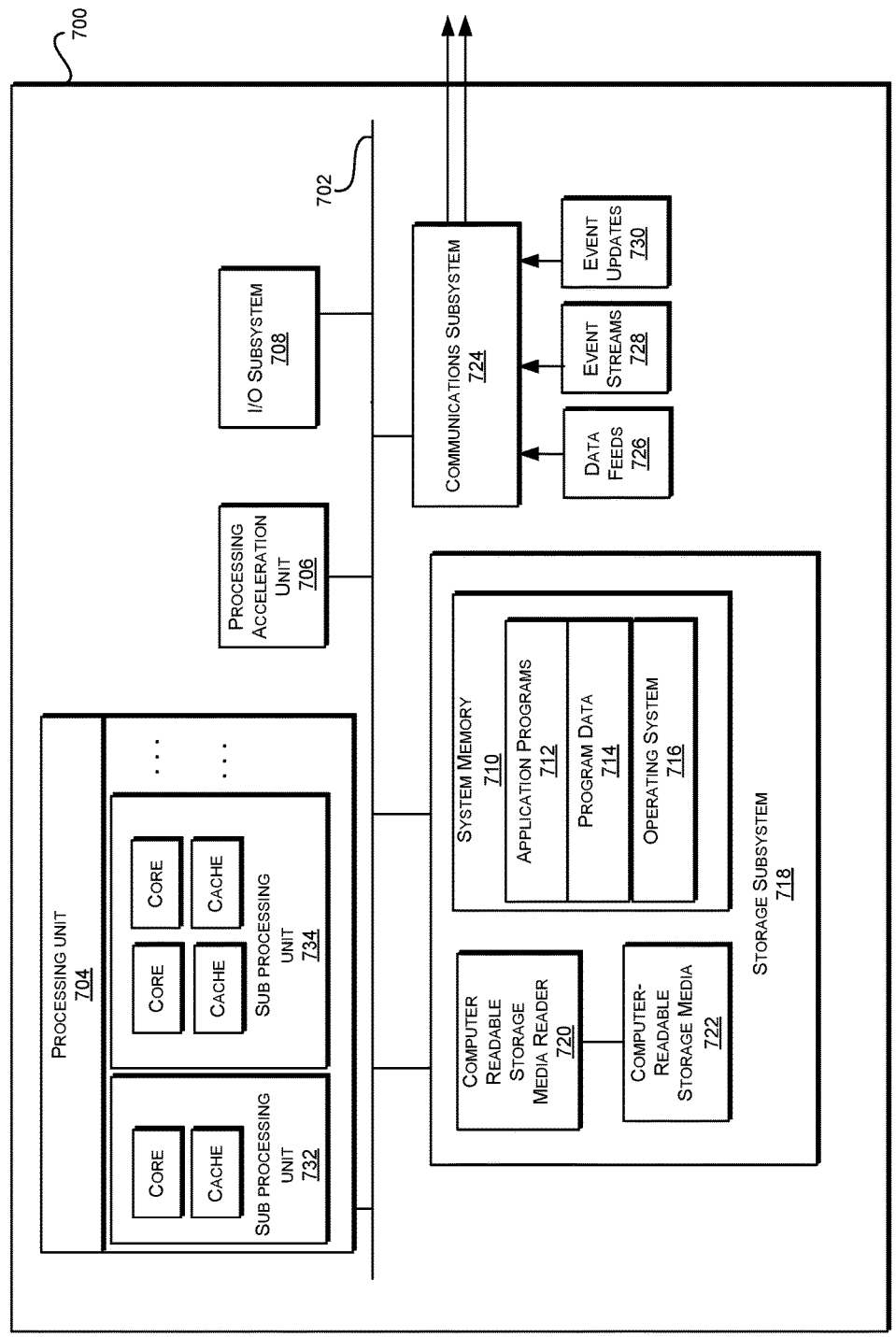
FIG. 7 is a block diagram illustrating an exemplary computer system in which embodiments may be implemented.

The CRM system 105 can be executed on a server or another computer or computing device as described in FIG. 7. The CRM system 105 can include product/service information database 110, workflows database 115, support interface module 120, workflow module 125, co-browsing module 135, and learning module 165.

Product/service information database 110 can be a database that contains information for products and/or services supported by the CRM system 105. The product/service information database 110 can be stored on a storage device within a computer system such as that described by FIG. 7. The product/service information database 110 can be communicatively coupled to the workflow module 125 to allow the workflow module 125 to query the product/service information stored in product/service information database 110.

Workflows database 115 can be a database that contains information defining any number of workflows utilized by the CRM system 105. The workflows database 115 can be stored on a storage device within a computer system such as that described by FIG. 7. Generally speaking, these workflows can comprise scripts for guiding a customer contact attempting to find information or troubleshoot a problem, selecting and/or guiding a customer service agent through performing troubleshooting, or other actions of the CRM system 105. Workflows database 115 can be communicatively coupled to the workflow module 125 to allow the workflow module 125 to query the workflows stored in workflows database 115.

Support interface module 120 can interface the CRM system with a support UI 130. The support interface module 120 can provide one or more support UIs 130 including but not limited to web pages, email addresses, phone lines, chat and/or instant messaging, and/or any of a variety of other communication channels to customer users of the system 100.

Workflow module 125 can be communicatively coupled with workflows 115, product/service information 110, support interface module 120, learning module 165, and routing module 145. Workflow module can select the appropriate workflow 115 which can be used by the agent 165, 170, 175 to handle a customer contact.

Co-browsing module 135 can be communicatively coupled with the support interface module and the agent network 160. Co-browsing module 135 can allow the agent 165, 170, 175 to co-browse with the customer through the support interface module 120 and the support UI 130. Particularly, co-browsing module 135 can allow the agent to preview co-browse the customer contact's web browser. Preview co-browsing is described in more detail in U.S. patent application Ser. No. 14/851,268 entitled CO-BROWSING PREVIEW OF QUEUED CUSTOMER CONTACTS, filed Sep. 11, 2015.

Learning module 165 can be communicatively coupled to workflow module 125, routing module 145, agent network 160, and routing rules database 180. Learning module can assess the routing that occurs either automatically or manually in the automated call distribution system 140 and, based on the resolution of the customer contacts, learn the proper routing. Based on this learned information, new routing rules can be created and various routing rules can be enabled or disabled within routing rules database 180 as described in further detail herein.

Support UI 130 can be a user interface accessible on a customer device. The customer can use the support UI 130 to request support and connect with an agent 165, 170, 175 for assistance. The Support UI 130 can be incorporated into a web page viewable in a web browser on the customer device. Optionally, the support UI 130 can be an application executed on the customer device.

ACD system 140 can include an agent profile information database 150, a routing module 145, agent queues 155, and routing rules database 180. The ACD system 140 can be executed on a server or another computer or computing device as described in FIG. 7. Optionally, the ACD system 140 can be part of the CRM system 105. Optionally, the CRM system 105 and ACD system 140 can be executing on the same server.

The agent profile information database 150 can be a database that contains agent profile information including availability and skills of agents 165, 170, 175. The agent profile information database 150 can be stored on a storage device within a computer system such as that described by FIG. 7. The agent profile information database 150 can be communicatively coupled to routing module 145 such that routing module 145 can query agent profile information database 150 for agent profile information.

Routing module 145 can be communicatively coupled to agent profile information database 150, agent queues 155, learning module 165, workflow module 125, and routing rules database 180. Routing module 145 can identify the correct agent 165, 170, 175 to route customer contacts to based on routing rules in the routing rules database 180 and agent skill information in the agent profile information database 150.

Agent queues 155 can be queues designed to temporarily house customer contacts while they await an agent 165, 170, 175 to become available. The queues can be queues that are serviced by more than one agent 165, 170, 175. Optionally, each queue can be assigned to a single agent 165, 170, 175. While in the agent queues 155, the agents 165, 170, 175 assigned to the agent queues 155 can view the customer contacts in the queue and can utilize the co-browsing module 135 to preview co-browse the customer's web page to determine how best to help the customer.

Routing rules database 180 can be a database that contains routing rules for routing customer contacts to the correct agent queues 155. The routing rules database 180 can be stored on a storage device within a computer system such as that described by FIG. 7. The routing rules database 180 can be communicatively coupled to the learning module 165 and the routing module 145.

Agents 165, 170, 175 can be customer service agents that work to resolve customer contacts awaiting support in the agent queues 155. Agents 165, 170, 175 can have skills and other associated information, which can be stored in agent profile information database 150. The agents 165, 170, 175 can be communicatively coupled to the ACD system 140 and the CRM system 105 via an agent network 160.

In use, the CRM system 105 can support a number of users, such as end users of a product or service. The CRM system 105 can receive requests for support or service from those users, and process those requests in order to direct the user to appropriate product or service information in product/service information database 110 and/or connect or direct the requesting users to one or more agents 165, 170, 175 for answers to questions posed in the requests. The users can utilize support UI 130 to communicate the request to customer relationship management system 105. For example, support interface module 120 of the CRM system 105 can provide one or more support UIs 125 including but not limited to web pages, email addresses, phone lines, chat and/or instant messaging, and/or any of a variety of other communication channels to customer users of the system 100. Through the support UI 130, the customers can contact the CRM system 105 to access information and/or make requests for support that may include questions to be answered by the agents 165, 170, 175. The support UI 130 can additionally send information about the user's desktop or activities on the current web page to the support interface module 120. For example, the support UI 130 can send a sequence of events to the support interface module 120. The sequence of events can be the keystrokes, error codes, and other information gathered during the customer's interaction with the support UI 130 or the web page on which the support UI 130 is embedded.

Once received by CRM system 105, the customer contacts and other information including the sequence of events can be evaluated by the workflow module 125 based on the product information in product/service information database 110, for example, to select an agent workflow from workflows database 115. That is, for a particular product and issue that is the subject of the contact, a workflow to be performed (e.g., to troubleshoot a problem, obtain more information, etc.), can be selected for performance by a customer service agent 165, 175, 175. The product information, selected workflow and other information received with the contact can be forwarded to a routing module 145 of the ACD system 140, which can then direct the contact to an agent queue 155 associated with a selected agent 165, 170, 175 with matching expertise. For example, the routing module 145 can identify a routing rule from routing rules database 180 that applies to the customer contact based on the product information, selected workflow, associated customer, and other information received from the workflow module. The routing module 145 can identify an agent 165, 170, 175 with a skillset defined in agent profile information database 150 that is appropriate for the nature of the contact based on the routing rule and then connect the customer with that agent through email, phone, chat and/or instant messaging, and/or any of a variety of other communication channels.

Once the agent 165, 170, 175 can see the contact in agent queues 155, the agent 165, 170, 175 can select the contact to co-browse, which is allowed by the co-browsing module 135. Co-browsing can allow the two to share screen images in near real-time. For example, the agent 165, 170, 175 can view, through his or her own interface, the current view of the customer's desktop and/or browser window. Such screen sharing through web browsers is referred to herein as co-browsing. Further, the agent 165, 170, 175 can preview co-browse, meaning that the agent 165, 170, 175 can see the customer contact in the agent queue 155 using an agent UI (not shown). The agent can, though the agent UI, select the customer contact to preview co-browse, allowing the agent 165, 170, 175 to view, through the agent's own interface, the current view of the customer's desktop and/or browser window prior to accepting the customer contact for communication. In this way, the customer may not communicate with the agent 165, 170, 175 until after the agent 165, 170, 175 has co-browsed.

Stated differently, once a customer contact has been assigned to an agent 165, 170, 175 but before that customer is actually connected with that agent (i.e., while the customer is waiting or holding for the agent 165, 170, 175 to begin the session), the contact can be assigned to an agent queue 155. Once the agent 165, 170, 175 has been selected, the customer contact has been assigned to that agent 165, 170, 175, and the contact has been placed into the agent's queue 155, co-browsing module 135 can provide the agent 165, 170, 175 with a view of that customer's browser so that the agent 165, 170, 175 can more quickly have a better understanding of the nature of the contact and the customer's current situation. Based on this preview, the agent 165, 170, 175 can make decisions about how best to handle the contact (i.e., whether to handle the contact as a chat, a voice call, to transfer the contact to another agent, etc.).

After having preview co-browsed the customer's desktop and/or browser window, the agent 165, 170, 175 can, for example, determine that the customer contact should be routed to a different agent/agent queue 155. As an example, perhaps the agent can tell based on the preview co-browsing that the customer is having trouble logging into their account on the company's website. If the agent is in a general customer service department, he or she may determine that the customer really needs to speak to an agent in the security department. Without communicating with the customer, the agent can transfer the customer contact to the security agent queue to be handled by an agent in the security department. In that way, the customer does not know that he or she was even transferred.

The manual transfer of the customer contact to a different agent queue 155 can cause the learning module 165 to review the transaction. For example, the learning module 165 can receive an indication that the customer contact was routed from the first agent to a second agent queue 155. The learning module 165 can optionally query the routing rules database 180 to determine whether a routing rule exists that matches the new routing. For example, the learning module 165 can query the routing rules database 180 for a routing rule that routes to the different agent queue based on the web page URL and the sequence of events. If the routing rule exists, the learning module can increase a counter associated with the routing rule. If the routing rule counter has passed a threshold number, the learning module can determine that the routing rule is valid and enable the routing rule. If the learning module does not find a matching routing rule, the learning module can create the routing rule and generate a counter associated with the routing rule, setting the counter to 1, for example. This process can continue for all contacts such that as time progresses, the routing rules become more and more specific to the company. The more specific rules can more accurately route contacts to the proper queue based on the information associated with the contact (e.g., customer information, sequence of events, URL, and so forth). More rules can be enabled and created resulting in a more specialized system for the company.

Although described in FIG. 1 as two separate systems, CRM system 105 and ACD system 140 can be a single system. The CRM system 105 and the ACD system 140 can be implemented on a single server or on a distributed system as understood by one of skill in the art. Further, individual modules (e.g., learning module 165, co-browsing module 135, and so forth) depicted in FIG. 1 can be configured differently including combined or further distributed as understood by one of skill in the art. Additionally, FIG. 1 describes one embodiment, but other routing systems and configurations can be used as understood by one of skill in the art.

Figure 2:
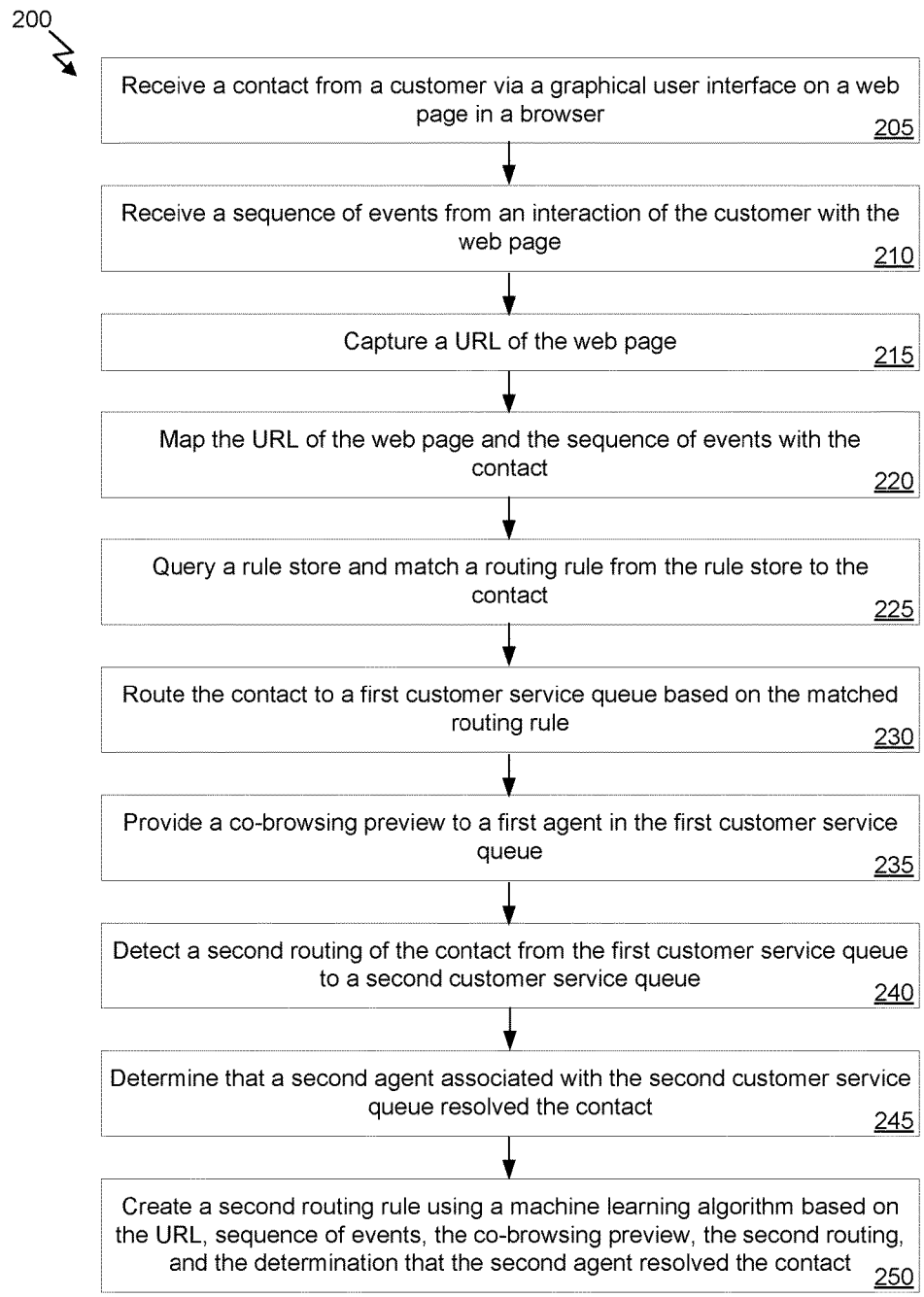
FIG. 2 illustrates a method for providing a self-learning adaptive routing system according to one embodiment.

FIG. 2 is a method 200 for providing a self-learning adaptive routing system. The method 200 can be performed by a computer system, such as the computer system described in FIG. 7. The method 200 can be performed by, for example, CRM system 105 of FIG. 1. Method 200 can begin at 205 with receiving a contact from a customer via graphical user interface on a web page in a browser. For example, support UI 130 of FIG. 1 can be on a web page in a browser on a customer computer. The customer can send a contact through the support UI to the CRM system.

At 210, the CRM system can receive a sequence of events from an interaction of the customer with the web page. For example, the customer may have encountered an error after clicking a button or link on the web page, which can be captured and sent to the support interface module 120 with the customer contact as a sequence of events.

At 215, the CRM system can capture the URL of the web page. For example, the URL can be sent with the customer contact to the support interface module 120. Optionally, for example, the support interface module 120 can request the URL information. After obtaining the information, for example, the support interface module 120 can pass the information to the workflow module 125.

At 220, the CRM system can map the URL of the web page and the sequence of events with the contact. The mapping information can be stored in a temporary memory or, for example, it can be stored in a database used to manage the information associated with currently pending customer contacts. While depicted in FIG. 1 as a single support UI 130, the CRM system 105 can handle any number of support UIs 130 on any number of customer devices.

At 225, the CRM system can query a rule store and match a routing rule from the rule store to the contact. For example, the routing module 145 can query the routing rules database 180 to find a matching routing rule based on the customer contact and mapped information. For example, the URL, the sequence of events, and the customer contact can all be used to identify a matching rule. As one example, the customer associated with the customer contact can be a VIP customer and have a special routing rule to a VIP queue to provide white glove service to the VIP customer (e.g., a VIP rule). As another example, a routing rule can exist that routes the customer contact to a specific queue when a contact originates from the specific URL (e.g., a URL rule). As yet another example, a routing rule can exist that routes the customer to a different specific queue when a contact originates from the specific URL and has the mapped sequence of events (e.g., an event rule). A yet one more example, a generic routing rule can exist that routes the customer to a general queue if there are no other matching rules (e.g., a default rule). The various example routing rules (VIP rule, URL rule, event rule, and default rule) can be, for example, all enabled. Further the example routing rules can each apply to a single customer contact. Optionally, the rules can have a priority attached such that, for example, the VIP rule has the highest priority, the event rule overrides the URL rule, and the default rule has the lowest priority.

At 230, the CRM system can route the contact to a customer service queue based on the matched routing rule. Stated differently, once the CRM system identified the matching routing rule, that routing rule can be used to route the customer contact to the appropriate agent queue. The routing rule may also provide for selecting an agent based on skills, which can be obtained from an agent profile database.

At 235, the CRM system can provide a co-browsing preview to an agent that picks up (i.e., begins to work on) the customer contact from the agent queue. For example, the co-browsing module 135 of FIG. 1 can allow the agent 165, 170, 175 to see the customer's web page, web browser, and/or desktop. The co-browsing preview can give the agent more information for determining what the customer might need assistance with. For example, if the customer's screen shows that the customer is at a login prompt with an error stating the login is invalid, the agent may determine that the customer is trying to obtain login assistance. Based on that information, the agent can determine that the customer should be routed to the security agent queue and can manually route the customer contact to the security agent queue.

At 240, the CRM system can detect a second routing of the contact from the first customer service queue to a second customer service queue. For example, the learning module 165 of FIG. 1 can detect the second routing, as in the example above, the second routing from the agent to the security agent queue. The detection can be, for example, because the manual routing triggers a notification. As another example, the detection can be because a service periodically runs to identify manual routing. Any appropriate detection method can be used.

At 245, the CRM system can determine that a second agent associated with the second customer service queue resolved the contact. For example, once the customer contact status is set to resolved, the CRM system can determine that the last agent to have received the contact resolved the contact. In continuing the security queue example above, if no further routing occurs and the contact is marked as resolved, the system can determine that an agent associated with the security agent queue resolved the contact.

Figure 3:
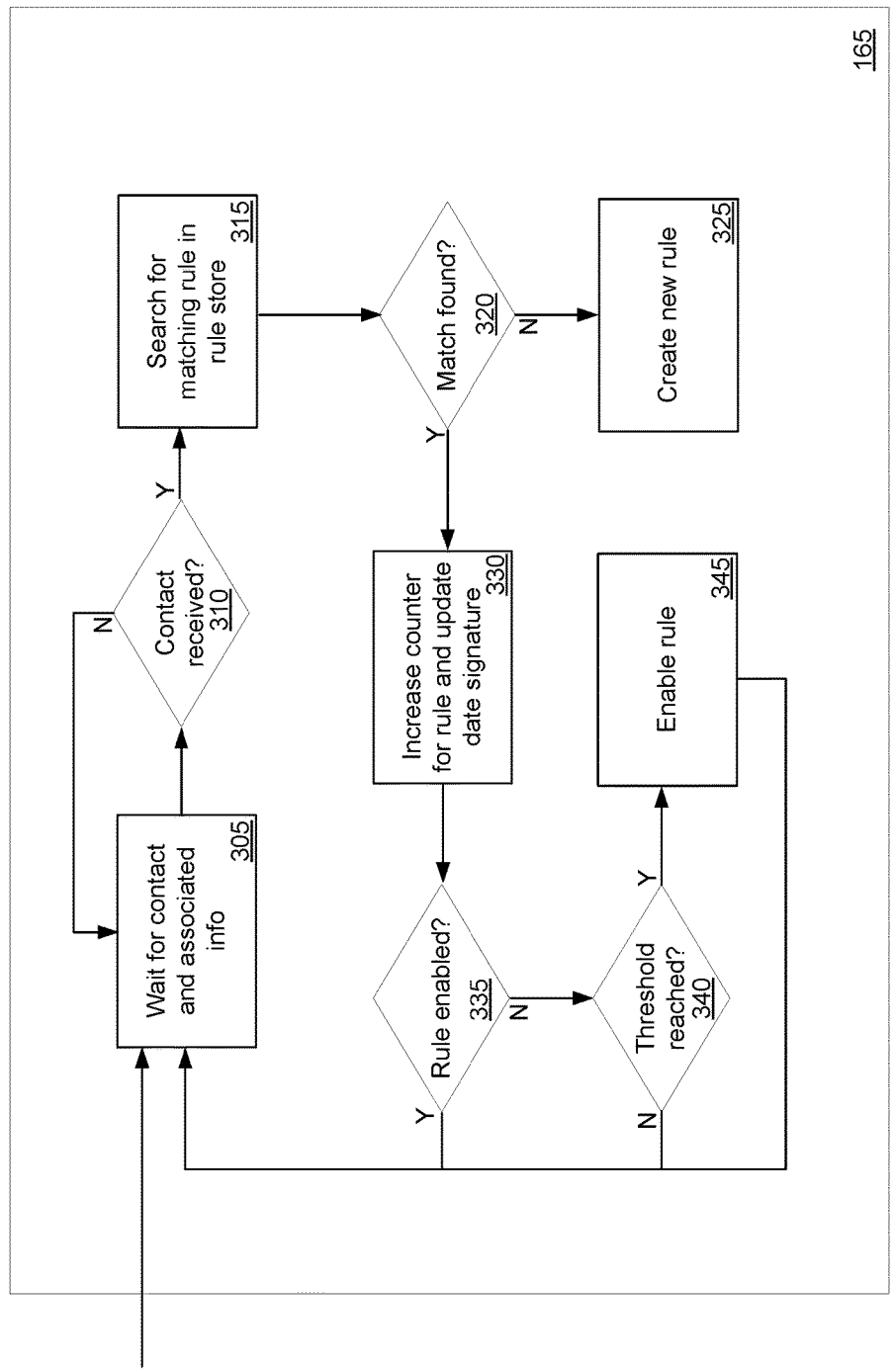
FIG. 3 is a flowchart illustrating a process of a self-learning module according to one embodiment.
Figure 4:
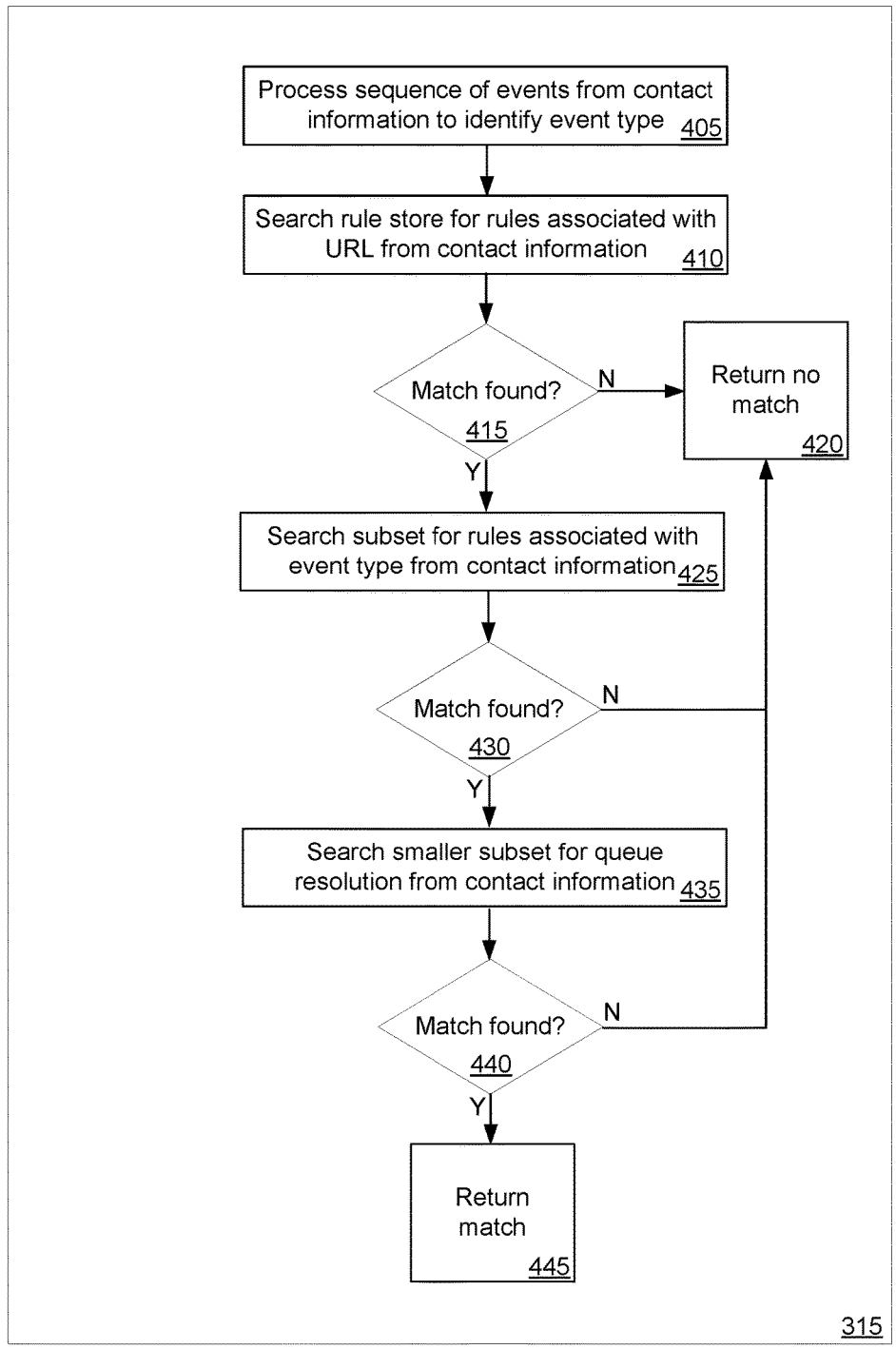
FIG. 4 is a flowchart illustrating a process of searching for a matching rule in a rule store according to one embodiment.

At 250, the CRM system can create a second routing rule using a machine learning algorithm based on the URL, the sequence of events, the co-browsing preview, the second routing, and the determination that the second agent resolved the contact. For example, if there was no matching rule using the URL and sequence of events that would route the contact to the agent queue that was responsible for resolving the contact, the CRM system can create a routing rule. Optionally, the second routing rule can remain disabled until a threshold number of contacts having the same URL and sequence of events are resolved by agents associated with the agent queue. In some cases, the matching rule exists and the counter associated with the rule can be incremented. FIGS. 3 and 4 discuss identifying a matching rule and/or creating a rule when no matching rule exists.

FIG. 3 is a flowchart illustrating a process of a self-learning module 165. The process can be performed, for example, by learning module 165 of FIG. 1. The process can be a machine learning algorithm developed to be executed on a CRM system for learning improved routing techniques. The process can begin at 305 where the algorithm can wait for a contact and associated information. The contact and associated information can include, for example, the URL from the web page from which the contact originated, a sequence of events captured from the customer interaction with that web page, the customer name, the agent and associated agent queue that resolved the contact, and so forth.

At 310, if the contact is not received, the algorithm can again wait for the contact and associated info at 305. If, at 310 the contact is received, the algorithm can search for a matching rule in the rule store at 315. For example, if a rule in the rule store matches the contact information such as the URL and sequence of events and is set to route to the queue that resolved the contact, then a match is found. If a matching rule is not found at 320, at 325 a new rule can be created. The new rule can include, for example, the URL of the web page and the sequence of events and set contacts with matching criteria to be routed to the agent queue that resolved the contact.

If a match is found, an optional step, not pictured, can be to check the date signature of the rule. If the date signature indicates that the previous use of the rule was more than, for example, a year ago, the algorithm may determine that the counter should be reset.

If a match was found, at 330, optionally, the algorithm can increase the counter for the rule and update the date signature. A date signature can optionally be maintained to determine whether the rule may be outdated. A match can be identified, optionally, at least partially using the sequence of events. Optionally, the algorithm can identify what sequence of events is matching. For example, an exact duplicate may not be required. As one example, if the user attempts to login to the website through the web page and receives an error message and then makes a second attempt and receives a second error message, the sequence of events can be, for example, "link1 clicked," "login clicked," "failed login," "login clicked," and "failed login." The sequence of events in the routing rule may contain only "login clicked" and "failed login." The algorithm can determine that the routing rule matches the contact. FIG. 4 describes a process for determining whether a match is found. Note that in some embodiments a date signature is used, and in others a date signature is not used. In some embodiments a counter is used to determine whether to enable the rule. In some embodiments a counter is not used and, for example, rules can be immediately enabled. Any other method for determining whether a rule should be enabled can be used.

Once the counter is increased at 330 after a match is found at 320, the algorithm can determine whether the rule is enabled at 335. If the rule is enabled, the algorithm can return to the beginning to wait for another contact at 305. If the rule is not enabled at 335, the algorithm can determine whether a threshold is reached at 340. The threshold value can be set by a system administrator to be a value that indicates that the rule has resolved enough contacts properly that it should be enabled and is not simply an anomaly.

If the threshold has been reached and the date signature is recent enough, at 345 the algorithm can enable the rule. If the threshold is not reached and/or the date signature is not recent enough, the algorithm can return to 305 to wait for another contact and associated information without enabling the rule.

FIG. 4 is a flowchart illustrating a process of searching for a matching rule in a rule store, such as at 315 of FIG. 3. The process can begin at 405 with processing the sequence of events from the contact information to identify an event type. For example, the sequence of events can indicate that the customer is having trouble logging in, in which case the event type can be, for example, "login failure." Identifying the event type can be done, for example, by comparing events in the sequence of events with events corresponding to an event type in a database. In some embodiments, the sequence of events can be used without an event type so an exact match may be needed to identify the sequence of events.

At 410, the algorithm for searching for a matching rule can search a rule store (e.g., routing rule database 180 of FIG. 1) for rules associated with the URL from the contact information. The search can return any rules that apply to that particular web page.

At 415, the algorithm can determine whether a match was found. If no match was found, the algorithm can return that there is not match at 420. Returning no match can result in the algorithm creating a new rule, such as at 325 of FIG. 3. If a new rule is created, the new rule can be configured to route future contacts matching the URL and event type to the queue that resolved the contact, for example. If a match is found, the one or more rules can be used going forward.

At 425, the one or more matching rules from the URL search can be searched for rules associated with the event type. For example, the matching rules from 415 can be searched for "login failure" to determine if any have a matching event type. Alternatively, rather than using an event type, the search can be for a matching sequence of events as discussed above. The sequence of events can be an exact match. Optionally, the sequence of events need not exactly match the sequences of events stored in the database. A substantial match can exist that may mean the routing rule is appropriate. For example, if a portion of the events in the sequence of events match the sequence of events in the database a match may be found. At 430, if no match is found, the algorithm can return no match at 420. Upon no match, a new rule can be created as discussed above. If a match is found at 430, the rules matching the URL and event type can be used going forward.

At 435, the rules having a matching URL and event type can be searched for the queue that resolved the contact being processed. For example, if the security agent queue resolved the contact, the remaining rules can be searched for the security agent queue as being the queue to route the contact to in the rules. Matching rules are identified at 440. If no rules match, the algorithm can return no match at 420. Upon no match, a new rule can be created as discussed above. If a match is found, the algorithm can return the match at 445. Should more than one rule match, additional review of the sequence of events and/or the date signature can be used, for example, to identify the closest or best match.

Figure 5:
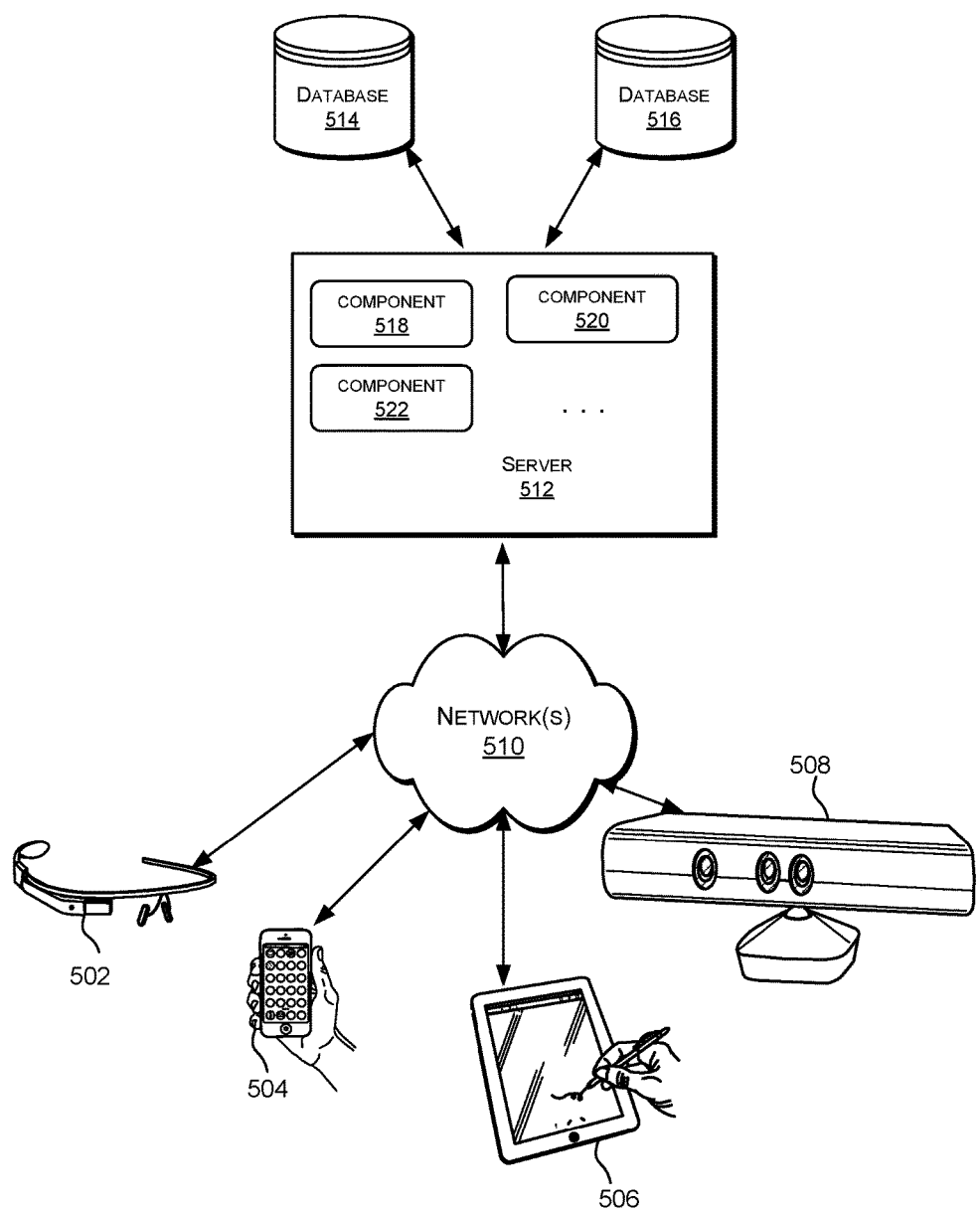
FIG. 5 is a block diagram illustrating components of an exemplary distributed system in which various embodiments may be implemented.

FIG. 5 is a block diagram illustrating components of an exemplary distributed system in which various embodiments may be implemented. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service ("SaaS") model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service ("SMS"), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network ("LAN"), such as one based on Ethernet, Token-Ring and/or the like. Network(s) 510 can be a wide-area network and the Internet. It can include a virtual network, including without limitation a virtual private network ("VPN"), an intranet, an extranet, a public switched telephone network ("PSTN"), an infra-red network, a wireless network (e.g., a network operating under any of the Institute of Electrical and Electronics ("IEEE") 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network ("SAN"). Similarly, any necessary files for performing the functions attributed to server 512 may be stored locally on server 512 and/or remotely, as appropriate. In one set of embodiments, databases 514 and 516 may include relational databases, such as databases provided by Oracle®, that are adapted to store, update, and retrieve data in response to SQL-formatted commands.

Figure 6:
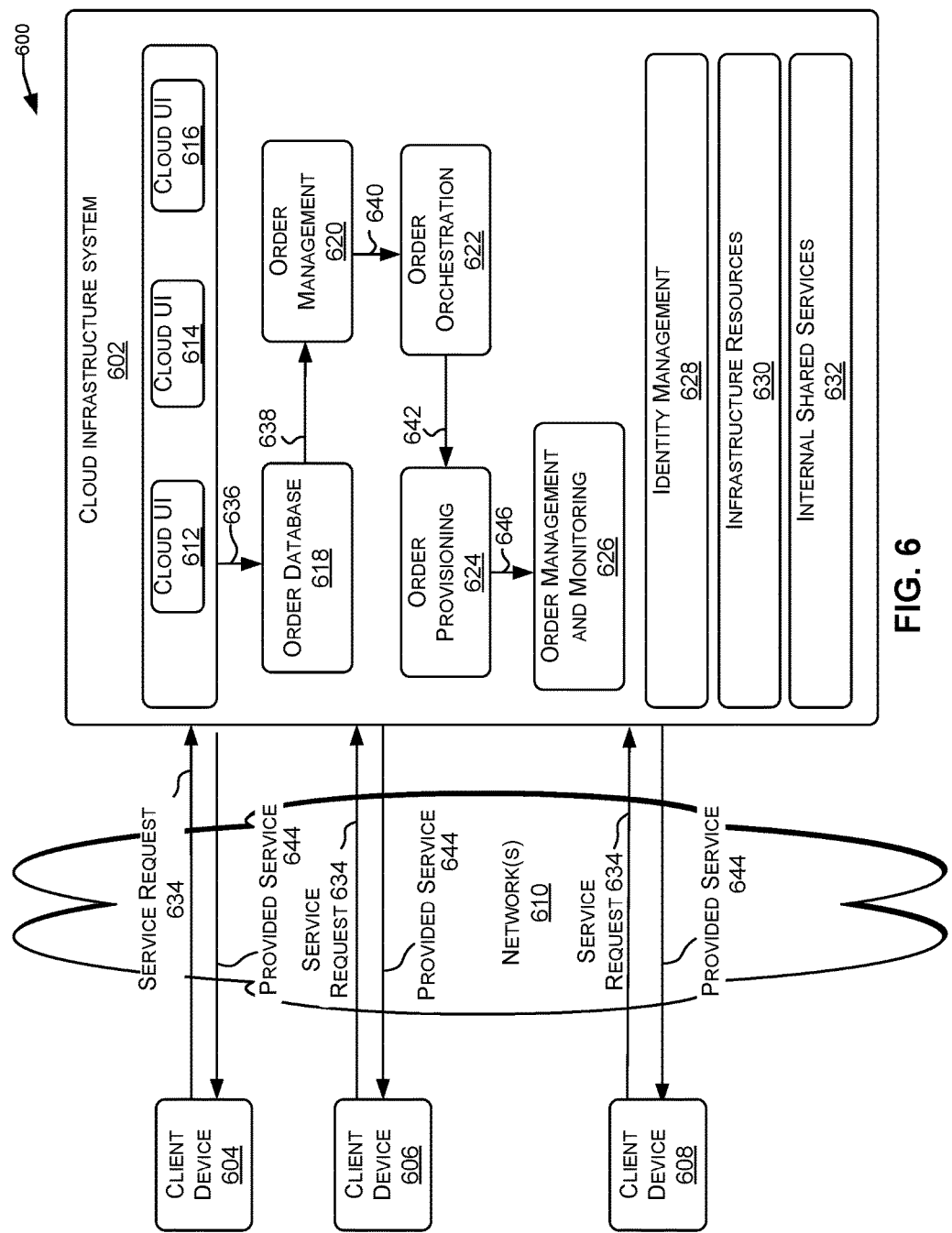
FIG. 6 is a block diagram illustrating components of a system environment by which services provided by embodiments may be offered as cloud services.

FIG. 6 is a block diagram illustrating components of a system environment by which services provided by embodiments may be offered as cloud services. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

FIG. 7 is a block diagram illustrating an exemplary computer system in which embodiments may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture ("ISA") bus, Micro Channel Architecture ("MCA") bus, Enhanced ISA ("EISA") bus, Video Electronics Standards Association ("VESA") local bus, and Peripheral Component Interconnect ("PCI") bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor ("DSP"), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with various embodiments.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM ("EEPROM"), flash memory or other memory technology, CD-ROM, digital versatile disk ("DVD"), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus ("USB") flash drives, secure digital ("SD") cards, DVD disks, digital video tape, and the like. Computer-readable storage media 722 may also include, solid-state drives ("SSD") based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM ("MRAM") SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency ("RF") transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments have been described in detail herein, it is to be understood that the inventive concepts may be otherwise variously embodied and employed, and that the appended claims are intended to be construed to include such variations, except as limited by the prior art.

What is claimed is:

1. A method for improving a Customer Relationship Management ("CRM") system, comprising:
    receiving, at the CRM system, a contact from a customer, the contact being initiated through a graphical user interface on a web page within a browser window;
    receiving, at the CRM system, a sequence of events captured from an interaction of the customer with the web page within the browser window;
    capturing, by the CRM system, a Universal Resource Locator ("URL") of the web page;
    mapping, by the CRM system, the URL of the web page and the sequence of events to the contact;
    querying, by the CRM system, a rule store having a plurality of routing rules;
    matching, by the CRM system, a first routing rule of the plurality of routing rules to the contact;
    routing, by the CRM system, the contact to a first customer service queue based on the first routing rule;
    providing, by the CRM system, a co-browsing preview of the browser window to a computer of a first agent associated with the first customer service queue;
    detecting, by the CRM system, a second routing of the contact from the first customer service queue to a second customer service queue;
    determining, by the CRM system, that a second agent associated with the second customer service queue resolved the contact; and
    creating, by the CRM system, a new routing rule using a machine learning algorithm based on the URL of the web page, the sequence of events, the co-browsing preview, the second routing, and the determination that the second agent associated with the second customer service queue resolved the contact.

2. The method of claim 1, wherein the sequence of events is a first sequence of events, the method further comprising:
    receiving, at the CRM system, a second contact from a second customer, the second contact being initiated through the graphical user interface on the web page within a second browser window;
    receiving, at the CRM system, a second sequence of events captured from a second interaction of the second customer with the web page within the second browser window, wherein the second sequence of events is equivalent to the first sequence of events;
    mapping, by the CRM system, the URL of the web page and the second sequence of events with the second contact; and
    routing, by the CRM system, the second contact to the second customer service queue using the new routing rule.

3. The method of claim 1, wherein the machine learning algorithm comprises:
    detecting, by the CRM system, a plurality of contacts that have been initiated through the graphical user interface on the web page and have been routed from the first customer service queue to the second customer service queue;
    determining, by the CRM system, that a threshold number of the plurality of contacts were resolved by one or more agents associated with the second customer service queue; and
    in response to determining that the threshold number of contacts were resolved by the one or more agents associated with the second customer service queue, enabling, by the CRM system, the new routing rule to route contacts initiated through the graphical user interface of the web page to the second customer service queue.

4. The method of claim 3, wherein the new routing rule is a first new routing rule and wherein the machine learning algorithm further comprises:
    detecting, by the CRM system, a second plurality of contacts that have been initiated through the graphical user interface on the web page and have been routed from the second customer service queue to a third customer service queue;
    in response to determining that the threshold number of contacts from the second plurality of contacts were resolved by one or more agents associated with the third customer service queue, creating, by the CRM system, a second new routing rule to route contacts initiated through the graphical user interface of the web page to the third customer service queue;
    enabling, by the CRM system, the second new routing rule to route contacts initiated through the graphical user interface of the web page to the third customer service queue; and
    disabling, by the CRM system, the first new routing rule.

5. The method of claim 1, wherein the first agent manually routes the contact to the second customer service queue based on the co-browsing preview of the web page with the customer.

6. The method of claim 1, wherein at least one event of the sequence of events comprises an error code.

7. The method of claim 1, wherein:
    a first event of the sequence of events is a login attempt;
    a second event of the sequence of events is an error code corresponding to a failed login attempt; and
    the second customer service queue is a security team queue.

8. A system, comprising:
    a processor; and
    a memory having stored thereon instructions, which when executed by the processor, cause the processor to:
        receive a contact from a customer, the contact being initiated through a graphical user interface on a web page within a browser window;
        receive a sequence of events captured from an interaction of the customer with the web page within the browser window;
        capture a Universal Resource Locator ("URL") of the web page;
        map the URL of the web page and the sequence of events with the contact;
        query a rule store having a plurality of routing rules;
        match a first routing rule of the plurality of routing rules to the contact;
        route the contact to a first customer service queue based on the first routing rule;
        provide a co-browsing preview of the browser window to a computer of a first agent associated with the first customer service queue;
        detect a second routing of the contact from the first customer service queue to a second customer service queue;
        determine that a second agent associated with the second customer service queue resolved the contact; and
        create a new routing rule using a machine learning algorithm based on the URL of the web page, the sequence of events, the co-browsing preview, the second routing, and the determination that the second agent associated with the second customer service queue resolved the contact.

9. The system of claim 8, wherein the sequence of events is a first sequence of events and wherein the memory has stored thereon further instructions, which when executed by the processor, cause the processor to:
receive a second contact from a second customer, the second contact being initiated through the graphical user interface on the web page within a second browser window;
receive a second sequence of events captured from a second interaction of the second customer with the web page within the second browser window, wherein the second sequence of events is equivalent to the first sequence of events;
map the URL of the web page and the second sequence of events with the second contact; and
route the second contact to the second customer service queue using the new routing rule.

10. The system of claim 8, wherein the machine learning algorithm comprises instructions, which when executed by the processor, cause the processor to:
detect a plurality of contacts that have been initiated through the graphical user interface on the web page and have been routed from the first customer service queue to the second customer service queue;
determine that a threshold number of the plurality of contacts were resolved by one or more agents associated with the second customer service queue; and
in response to determining that the threshold number of contacts were resolved by the one or more agents associated with the second customer service queue, enable the new routing rule to route contacts initiated through the graphical user interface of the web page to the second customer service queue.

11. The system of claim 10, wherein the new routing rule is a first new routing rule and wherein the machine learning algorithm comprises further instructions, which when executed by the processor, cause the processor to:
detect a second plurality of contacts that have been initiated through the graphical user interface on the web page and have been routed from the second customer service queue to a third customer service queue;
in response to determining that the threshold number of contacts from the second plurality of contacts were resolved by one or more agents associated with the third customer service queue, create a second new routing rule to route contacts initiated through the graphical user interface of the web page to the third customer service queue;
enable the second new routing rule to route contacts initiated through the graphical user interface of the web page to the third customer service queue; and
disable the first new routing rule.

12. The system of claim 8, wherein the first agent manually routes the contact to the second customer service queue based on the co-browsing preview of the web page with the customer.

13. The system of claim 8, wherein at least one event from the sequence of events comprises an error code.

14. The system of claim 8, wherein:
a first event of the sequence of events is a login attempt;
a second event of the sequence of events is an error code corresponding to a failed login attempt; and the second customer service queue is a security team queue.

15. A computer-readable memory device having stored thereon a set of instructions, which when executed by a processor, causes the processor to:
receive a contact from a customer, the contact being initiated through a graphical user interface on a web page within a browser window;
receive a sequence of events captured from an interaction of the customer with the web page within the browser window;
capture a Universal Resource Locator ("URL") of the web page;
map the URL of the web page and the sequence of events with the contact;
query a rule store having a plurality of routing rules;
match a first routing rule of the plurality of routing rules to the contact;
route the contact to a first customer service queue based on the first routing rule;
provide a co-browsing preview of the browser window to a computer of a first agent associated with the first customer service queue;
detect a second routing of the contact from the first customer service queue to a second customer service queue;
determine that a second agent associated with the second customer service queue resolved the contact; and
create a new routing rule using a machine learning algorithm based on the URL of the web page, the sequence of events, the co-browsing preview, the second routing, and the determination that the second agent associated with the second customer service queue resolved the contact.

16. The computer-readable memory device of claim 15, wherein the sequence of events is a first sequence of events, and wherein the computer-readable memory device having stored thereon further instructions, which when executed by the processor, cause the processor to:
receive a second contact from a second customer, the second contact being initiated through the graphical user interface on the web page within a second browser window;
receive a second sequence of events captured from a second interaction of the second customer with the web page within the second browser window, wherein the second sequence of events is equivalent to the first sequence of events;
map the URL of the web page and the second sequence of events with the second contact; and
route the second contact to the second customer service queue using the new routing rule.

17. The computer-readable memory device of claim 15, wherein the machine learning algorithm comprises instructions, which when executed by the processor, cause the processor to:
detect a plurality of contacts that have been initiated through the graphical user interface on the web page and have been routed from the first customer service queue to the second customer service queue;
determine that a threshold number of the plurality of contacts were resolved by one or more agents associated with the second customer service queue; and
in response to determining that the threshold number of contacts were resolved by the one or more agents associated with the second customer service queue, enable the new routing rule to route contacts initiated through the graphical user interface of the web page to the second customer service queue.

18. The computer-readable memory device of claim 17, wherein the new routing rule is a first new routing rule and wherein the machine learning algorithm comprises further instructions, which when executed by the processor, cause the processor to:
   detect a second plurality of contacts that have been initiated through the graphical user interface on the web page and have been routed from the second customer service queue to a third customer service queue;
   in response to determining that the threshold number of contacts from the second plurality of contacts were resolved by one or more agents associated with the third customer service queue, create a second new routing rule to route contacts initiated through the graphical user interface of the web page to the third customer service queue;
   enable the second new routing rule to route contacts initiated through the graphical user interface of the web page to the third customer service queue; and
   disable the first new routing rule.

19. The computer-readable memory device of claim 15, wherein the first agent manually routes the contact to the second customer service queue based on the co-browsing preview of the web page with the customer.

20. The computer-readably memory device of claim 15, wherein at least one event of the sequence of events comprises an error code.

* * * * *

UNITED STATES PATENT AND TRADEMARK OFFICE
CERTIFICATE OF CORRECTION

PATENT NO. : 10,038,788 B1
APPLICATION NO. : 15/590543
DATED : July 31, 2018
INVENTOR(S) : Khalatian Page 1 of 1

It is certified that error appears in the above-identified patent and that said Letters Patent is hereby corrected as shown below:

On the Title Page

Column 2, under Other Publications, Line 1, delete "Google©," and insert -- Google®, --, therefor.

On page 2, Column 2, under Other Publications, Lines 14-15, delete "lsiden/tutorials/signed-ppletlsignedapplet.html>," and insert -- lsiden/tutorials/signed-appletlsignedapplet.html>, --, therefor.

In the Specification

In Column 6, Line 57, delete "("UP")" and insert -- ("UI") --, therefor.

Signed and Sealed this
Twenty-first Day of May, 2019

Andrei Iancu
*Director of the United States Patent and Trademark Office*